(12) United States Patent
Daoud

(10) Patent No.: US 6,249,635 B1
(45) Date of Patent: Jun. 19, 2001

(54) UNIVERSAL FIBER OPTIC SPLICE HOLDER

(75) Inventor: Bassel Hage Daoud, Parsippany, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/391,016

(22) Filed: Sep. 7, 1999

(51) Int. Cl.[7] .................................................. G02B 6/38
(52) U.S. Cl. ............................. 385/137; 385/99; 385/59
(58) Field of Search ................................. 385/134, 137, 385/135, 69, 99, 59

(56) References Cited

U.S. PATENT DOCUMENTS 5,222,184 * 6/1993 Fose ...................................... 385/137
5,796,908 * 8/1998 Vicory .................................. 385/135

* cited by examiner

Primary Examiner—Hung N. Ngo
(74) Attorney, Agent, or Firm—Stroock & Stroock & Lavan LLP

(57) ABSTRACT

A splice holder is provided to accommodate different size splices of fiber optic cables, including fusion splices and array ribbon splices. The splice holder is formed with a plurality of deflectable arms for engaging and latching onto the splices. The arms cooperate with walls to hold splices on the holder.

6 Claims, 5 Drawing Sheets

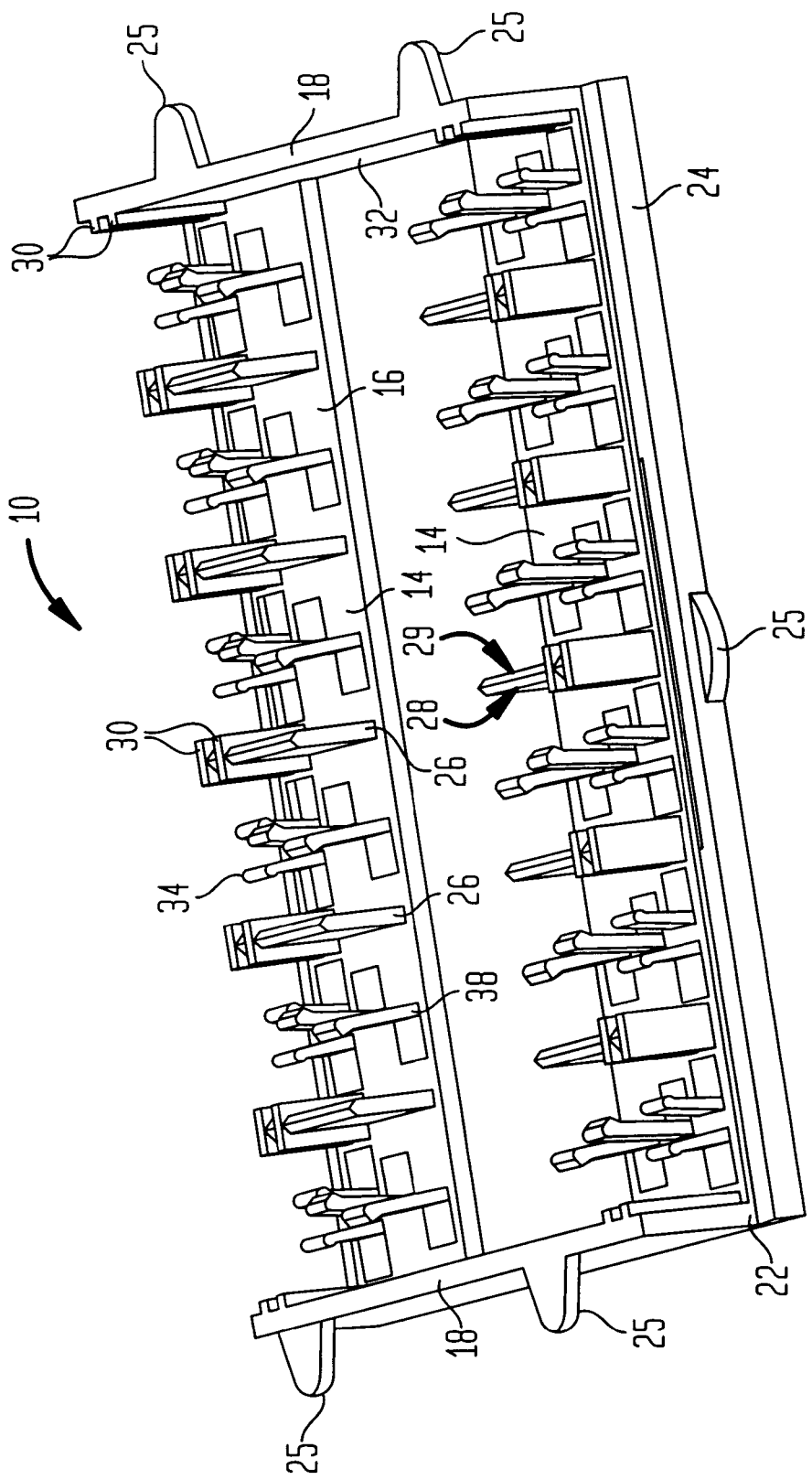

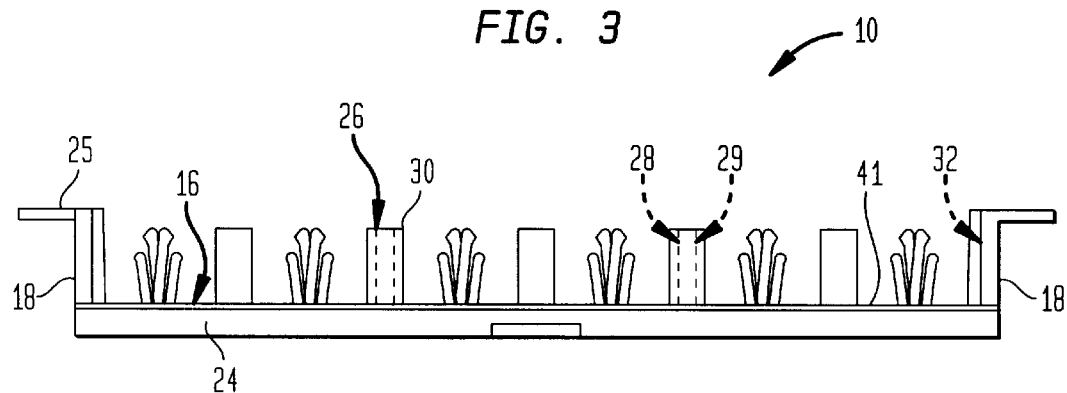
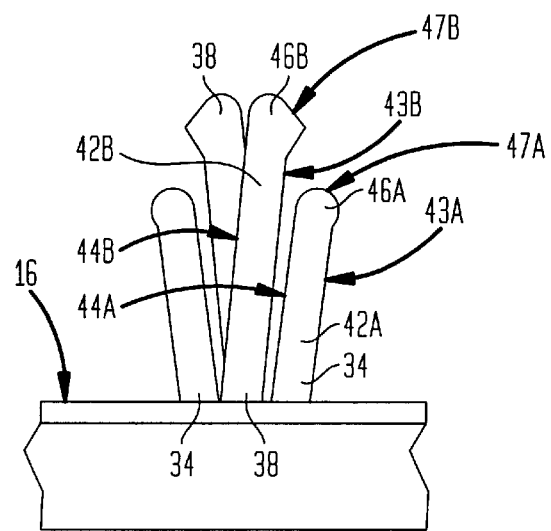

UNIVERSAL FIBER OPTIC SPLICE HOLDER

FIELD OF THE INVENTION

This invention relates to the field of fiber optic cable management and, more particularly, to fiber optic cable splice holders.

BACKGROUND OF INVENTION

It is envisioned that one day, all telephone wires will be replaced by fiber optic cables. To be able to properly identify a particular fiber optic cable in a central office, or other station where there may be hundreds to thousands of such cables, fiber optic cable management is necessary, wherein bundles of cables/single cables are passed through holders, guides, etc., to and from terminal points. In this manner, a technician may readily identify a particular cable needing servicing or replacement by its path.

In the prior art, various devices and techniques have been developed to manage standard copper telephone wiring. However, fiber optic cables are physically much weaker and more brittle than copper wiring. Additionally, splices of fiber optic cables are particularly susceptible to failure and require special consideration.

There are basically two types of fiber optic cable splices: fusion splices and array ribbon splices. A fusion splice is used to join one fiber optic cable to another, wherein the two cables are fused together. An array ribbon is a flat ribbon formed by a plurality of joined fiber optic cables (sheaths disposed about the cables are joined, not the cables themselves). In an array ribbon splice, two array ribbons are mass fused with cables of both ribbons being individually joined. To prevent damage to, and possible failure of, the fused joint, a reinforcing bar is typically provided. Additionally, the reinforcing bar and the fused joint are invaginated within a protective sheath.

In a final state, with reinforcing bar and all, the diameter of a fusion splice is much smaller in size than the diameter of an array ribbon splice. (As used herein, the term "splice" refers to the assembly of a fused joint of fiber optic cables, and generally, although not necessarily, a reinforcing bar, and a protective sheath.) As such, a holder designed to hold fusion splices will not accommodate array ribbon splices, and vice versa.

It is an object of the subject invention to a provide a splice holder for accommodating both fusion splices and array ribbon splices.

SUMMARY OF THE INVENTION

The aforementioned object is met by a splice holder formed with several upwardly extending walls, a plurality of deflectable fusion splice arms, and a plurality of deflectable array ribbon splice arms. At least one fusion splice arm and at least one array ribbon splice arm are disposed to face each wall and define a splice receiving channel therewith. The wall coacts with the associated fusion splice arm to engage and hold a fusion splice or, alternatively, coacts with the associated array ribbon splice arm to engage and hold an array ribbon splice.

The fusion splice arm and the array ribbon splice arm are similarly shaped but differently dimensioned. In most instances, splices have circular cross-sectional shapes. Specifically, both types of arms are formed with a stem and depending detent; however, the array ribbon splice arm has a longer stem and a larger detent as compared to the fusion splice arm to facilitate engagement of a larger diameter splice. In this manner, the array ribbon splice arm is formed to engage and latch onto an array ribbon splice, whereas, the fusion splice arm is formed to engage and latch onto a fusion splice.

The spacing between the respective arms and the associated wall is dictated by the diameter of the splice to be engaged. Thus, the fusion splice arm is located at a shorter distance from the associated wall to define a smaller width portion of the splice receiving channel sized to accommodate a fusion splice, as compared to a larger width portion of the splice receiving channel defined between the array ribbon splice arm and the wall, which is sized to accommodate an array ribbon splice.

In a preferred embodiment, the wall is formed with a protruding limiting wall section that extends towards and faces the fusion splice arm. The limiting wall section performs two principal functions. First, the limiting wall section cooperatively defines a passage with the fusion splice arm to accommodate a fusion splice. As such, the fusion splice arm is located further from the wall, as compared to if no limiting wall section was provided. This location of the fusion splice arm defines a more unobstructed passage for an array ribbon, as described below. Second, the limiting wall acts as a stop against axial movement of an engaged array ribbon splice.

In arranging the arms, it is preferred that the fusion splice arms be located closer to the longitudinal ends of the splice holder than the array ribbon splice arms. Because the smaller width portions of the splice receiving channels are too small to accommodate array ribbon splices, an array ribbon splice, which is to be engaged and held by the splice holder, must be formed sufficiently short enough to fit between longitudinally spaced apart fusion splice arms, but yet have sufficient length to be engaged and held by the array ribbon arms. Array ribbons extending from an engaged array ribbon splice are disposed to pass between the fusion splice arms and corresponding limiting wall sections. The fusion splice arms and the limiting wall sections act to limit movement of the array ribbons. The passages defined between the limiting wall sections and the fusion splice arms are respectively centered with engaged array ribbon splices, thus, in each instance, defining a minimally obstructed passages for array ribbons extending from the engaged splice.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference numerals depict like elements throughout the several views:

FIG. 2 is a side perspective view of the splice holder of the subject invention;

FIG. 3 is a side elevational view of the splice holder of the subject invention;

FIG. 3A is an enlarged view of two of the array ribbon splice arms and two of the fusion splice arms;

DETAILED DESCRIPTION OF THE PREFERRED EMBODIMENTS

Figure 1:
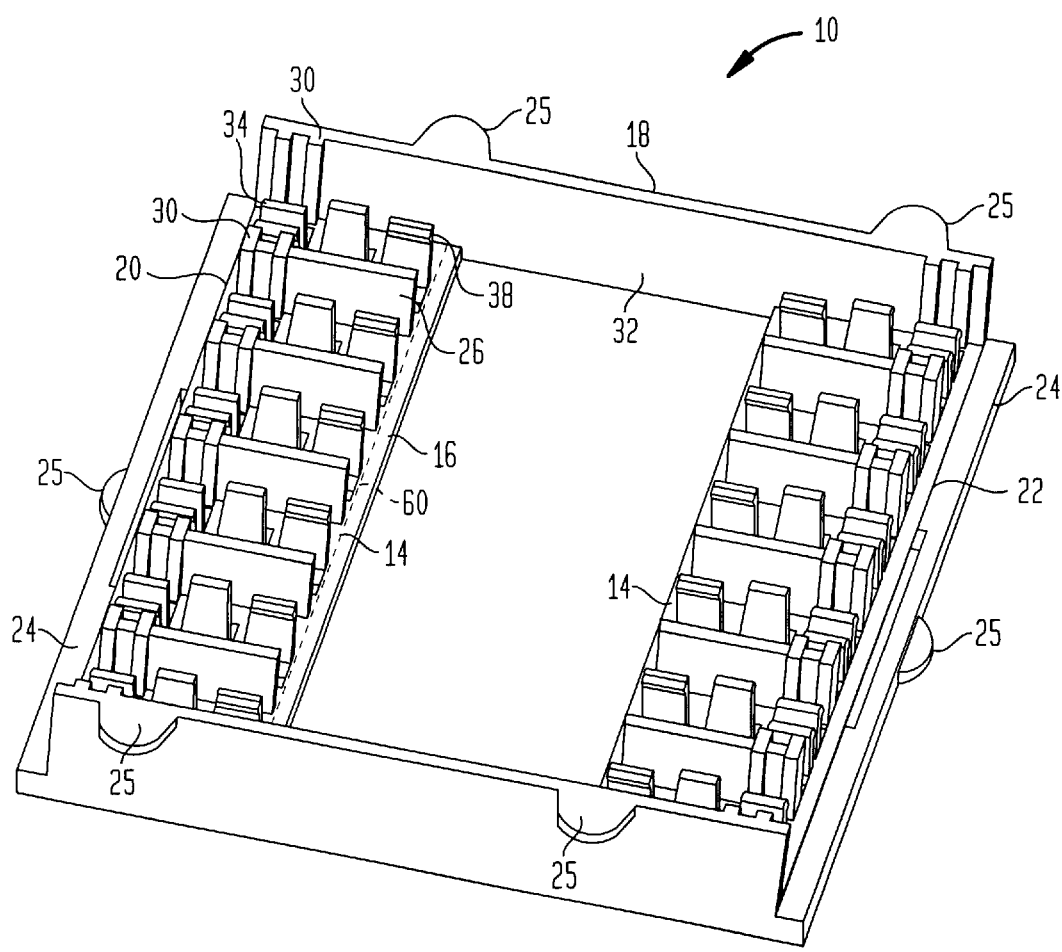
FIG. 1 is a front perspective view of the splice holder of the subject invention.
Figure 4:
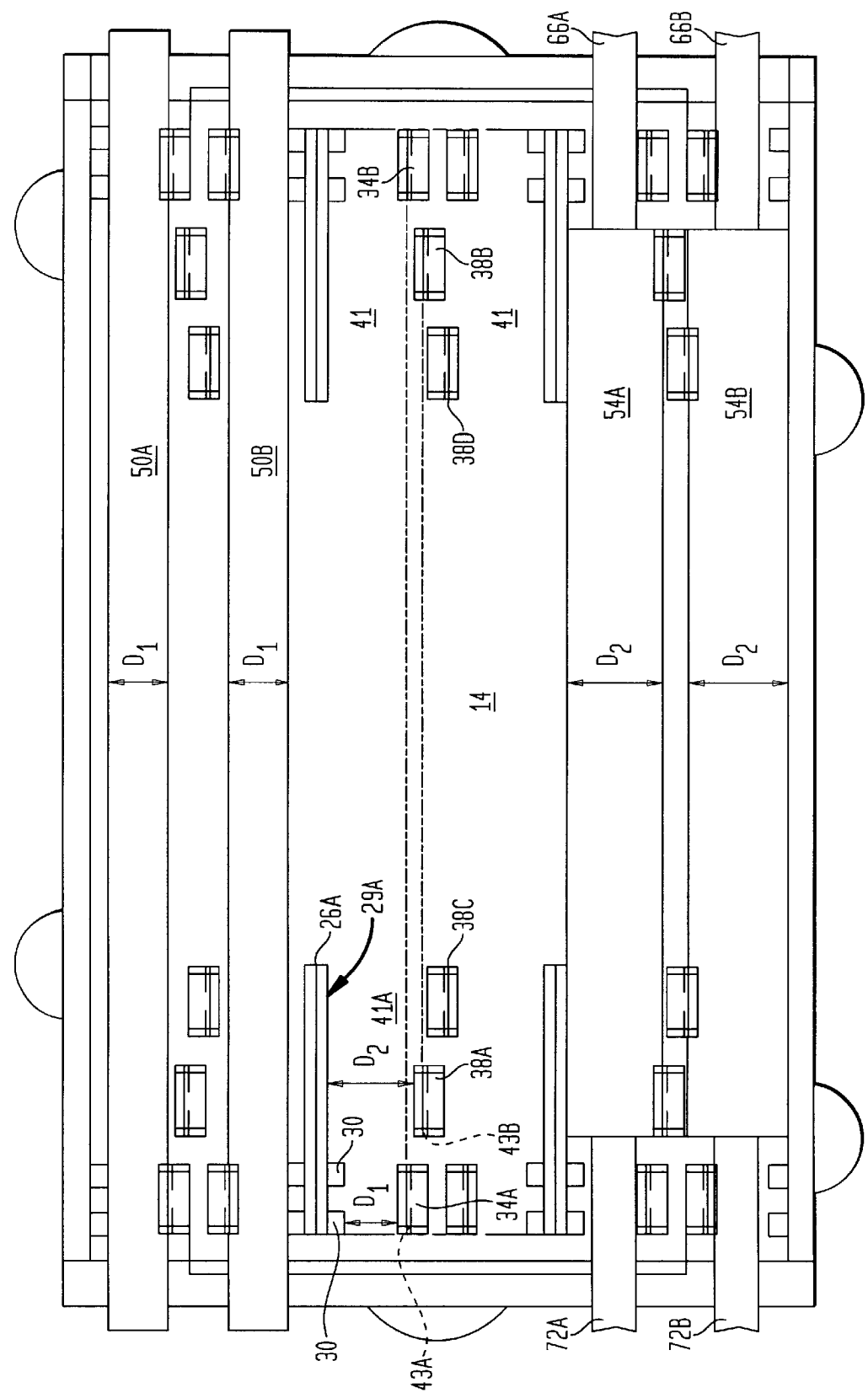
FIG. 4 is a top plan view of the splice holder of the subject invention, with the splice holder engaging and holding two fusion splices and two array ribbon splices; and, FIG. 5 is a side elevational view of the splice holder shown in FIG. 4, with the two fusion splices and the two array ribbon splices being engaged and held thereby.

Referring initially to FIGS. 1, 2, 3 and 4, a splice holder is shown and designated generally with the reference numeral 10. The splice holder 10 is formed with a base 14 that, as shown in FIG. 1, can be discontinuously formed with spaced-apart, coplanar portions, or alternatively, as a single, continuous planar base extending the full length of the splice holder 10, as shown in FIG. 4. The base has an upper surface 16 and a lower surface 17.

The splice tray 10 includes side walls 18 that extend upwardly from the base 14 to bound portions of the upper surface 16. The base 14 also has ends 20, 22 from which flanges 24 preferably extend. As shown in FIG. 1, the flanges 24 define outwardly extending shoulders that may be used to mount the splice holder 10 into an opening in a tray or other enclosure. Additionally, tabs 25 can be formed on the side walls 18 and/or the flanges 24 to also facilitate mounting of the splice holder 10 into an opening in a desired location.

A plurality of obstruction walls 26 are provided which extend upwardly from the base 14. Each of the obstruction walls 26 defines opposing splice engaging surfaces 28, 29. Additionally, the side walls 18 define inwardly facing splice engaging surfaces 32. Preferably, at least one limiting wall section 30 protrudes from each of the splice engaging surfaces 28, 29, 32 to extend towards and face a fusion splice arm. In a preferred embodiment, two of the limiting wall sections 30 are matched with each of the fusion splice arms.

The splice holder 10 also has a plurality of fusion splice arms 34 and array ribbon splice arms 38 that extend upwardly from the upper surface 16 of the base 14. To explain the principles of the subject invention, the following discussion focuses on certain of the splice arms. It is to be understood that this discussion is for illustrative purposes, and in no way limits the disclosure herein. The non-referenced splice arms are formed, configured and work in accordance with the discussed principles.

Referring to FIG. 3A, the fusion splice arms 34 and the array ribbon splice arms 38 are similarly shaped, but are dimensioned different. Specifically, the fusion splice arms 34 are each formed with a stem 42A, having inner and outer surfaces 43A, 44A, and a detent 46A depending from the stem 42A. The detent 42A is formed to extend beyond the inner surface 43A to define a latching element for engaging and latching onto a fusion splice, as described below. Similarly, the array ribbon splice arms 38 are each formed with a stem 42B, having inner and outer surfaces 43B, 44B, and a detent 46B depending from the stem 42B. The detent 42B is formed to extend beyond the inner surface 43B to define a latching element for engaging and latching onto an array ribbon splice, as described below. Since an array ribbon splice has a larger diameter than a fusion splice, the stems 42B are formed longer than the stems 42A to accommodate the different diameters, and, thus the array ribbon splice arms 38 are formed with a greater height than the fusion splice arms 34. Additionally, it is preferred that the detents 42B be formed to extend further from the respective inner surfaces 43B, as compared to the extent the detents 42A extend from the respective inner surfaces 43A.

The fusion splice arms 34 and the array ribbon splice arms 38 are all resilient and deflectable. FIG. 3 most clearly shows the arms 34, 38 in undeflected, natural states. The arms 34, 38 are biased into the natural states by their resiliency. Preferably, the detents 42A, 42B are each formed with a curved or ramped camming surface 47A, 47B, respectively to facilitate deflection of the respective arm by efficiently translating a downward force applied thereto by a splice to a lateral deflection force.

Each of the fusion splice arms 34 is longitudinally spaced from, and paired with one of the array ribbon splice arms 38. The pairs of arms 34, 38 are matched with one of the side walls 18 or obstruction walls 26. Both arms 34, 38 of the pair are arranged to have their respective inner surfaces 43A, 43B face the splice engaging surface 28, 29, 32 of the matched side wall 18 or obstruction wall 26. The pair of arms 34, 38 in combination with the matched side wall 18 or obstruction wall 26 define a splice receiving channel 41. Referring to FIG. 4 by example, fusion splice arm 34A is longitudinally offset from array ribbon splice arm 38A and both arms are matched with the obstruction wall 26A to define the splice receiving channel 41A. Also, the inner surfaces 43A, 43B of the arms 34A, 38A both face the splice engaging surface 29A of the obstruction wall 26A.

In addition, it is preferred that each fusion splice arm 34 be longitudinally aligned with at least one other fusion splice arm 34 such that aligned arms lie on a common axis. Referring to the example of FIG. 4, fusion splice arm 34B is aligned on reference axis A, along with the fusion splice arm 34A. Likewise, it is preferred that each array ribbon splice arm 38 be longitudinally aligned with at least one other array ribbon splice arm 38 such that aligned arms lie on a common axis. Again, referring to the example of FIG. 4, array ribbon arm 38B is aligned on reference axis B, along with the array ribbon splice arm 38A. By respectively longitudinally aligning fusion splice arms 34 and array ribbon splice arms 38, splice receiving channels 41 are in effect also extended.

Additionally, the fusion splice arms 34 are located to be at shorter distances from the matched side wall 18 or obstruction wall 26 than the array ribbon splice arms 38. In the preferred embodiment, the fusion splice arms 34 and the associated limiting walls sections 30 define widths (D1) with the associated limiting wall sections 30 of the splice receiving channels 41. The widths (D1) are smaller in size than the widths (D2) of the splice receiving channels 41 defined by the array ribbon arms 38 and the splice engaging surfaces 28, 29, 32 of the matched side wall 18 or obstruction wall 26. The specific widths (D1, D2) are dictated by the diameters of the splices to be engaged: the width D1 nominally equals the diameter D1 of a fusion splice 50A, 50B shown in FIG. 4; whereas, the width D2 nominally equals the diameter D2 of an array ribbon splice 54A, 54B shown in FIG. 4 Although not shown, as an alternative, where the limiting wall sections 30 are not provided, the fusion splice arms 34 are located to define the width D1 directly with the splice engaging surfaces 28, 29, 32 of the matched side wall 18 or obstruction wall 26.

Additionally, the fusion splice arms 34 and the limiting wall sections 30 are disposed closer to the ends 20, 22 of the base 14 than the array ribbon splice arms 38. With this arrangement, array ribbon splices can be engaged and held, as described below, without obstruction from the fusion splice arms 34. Also, the limiting wall sections 30 and the fusion splice arms 34 are positioned to act as stops against axial movement of an engaged and held array ribbon splice.

Figure 5:
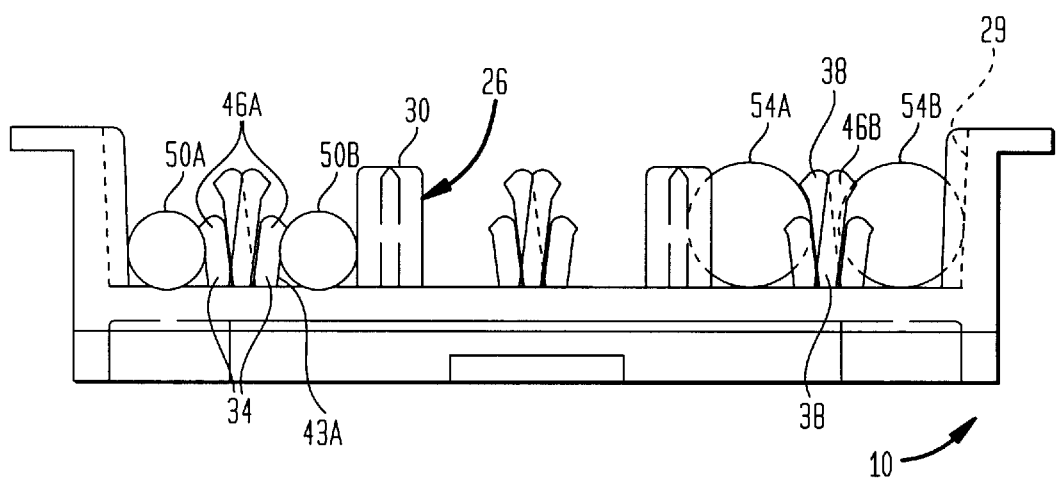

In use, fusion splices 50A, 50B and/or array ribbon splices 54A, 54B can be engaged and held by the splice holder 10. To mount one of the fusion splices 50A, 50B, the fusion splice 50A is pressed downwardly against the camming surfaces 47A of the detents 46A of longitudinally aligned fusion splice arms 34. The applied downward force causes deflection of the fusion splice arms 34 and allows the fusion splice 50A to be nested within the splice receiving channel 41, between the inner surfaces 43A of the fusion splice arms 34 and the limiting wall sections 30, as shown best in FIG. 5. With the fusion splice 50A being nested, the deflecting force is removed from the fusion splice arms 34. The resilience of the fusion splice arms 34 urges the arms to return to their natural, undeflected states, wherein, as shown in FIG. 5, the detents 46A are formed to latch onto the fusion splice 42A. It is preferred that the fusion splice arms 34 be configured and located such that the resilience of the fusion splice arms 34 generates pressure on the side of the fusion splice 50A and, in effect, clamp the fusion splice 50A with the limiting wall sections 30. The combination of the generated pressure, the limiting wall sections 30, and the latching of the detents 46A provides a holding force for maintaining the fusion splice 50A within the splice holder 10.

With the fusion splice 50A being mounted, a second fusion splice 50B can be mounted in similar fashion to the splice holder 10. Advantageously, the fusion splice 50B can be mounted, without hindrance from the mounted splice 50A.

Further, the array ribbon splice 54A can also be mounted into one of the splice receiving channels 41 of the splice holder 10, by utilizing longitudinally aligned array ribbon splice arms 38 and splice engaging surfaces 28, 29, 32 of the matching side wall 18 or obstruction wall 26. Referring to FIG. 4, the array ribbon splice 54A must be formed sufficiently short enough to fit between longitudinally aligned fusion splice arms 34 and between limiting wall sections 30. Yet, the array ribbon splice 54A must have sufficient length to be engaged by longitudinally aligned sets of array ribbon splice arms 38. The array ribbon splice 54A is caused to be engaged by array ribbon splice holders 38 in similar fashion to that described above with respect to the mounting of the fusion splice 50A. Here, however, the array ribbon splice 54A is pressed against one of the splice engaging surfaces 28, 29, 32. A second array ribbon splice 54B can also be mounted in similar fashion. As an additional feature, array ribbons 66A, 66B, 72A, 72B which extend from engaged array ribbon splices 54A, 54B are each directed to pass out of the splice holder 10 through portions of the respective splice receiving channels 41 and between the fusion splice arm 34 and the corresponding limiting wall section 30. Since the portion of the splice receiving channel 41 between the fusion splice arm 34 and the corresponding limiting wall section 30 has a reduced width D1, the reduced width passage serves to restrict movement of the array ribbons 66A, 66B, 72A, 72B passing therethrough. The restriction of movement of the array ribbons 66A, 66B, 72A, 72B facilitates cable management.

As is readily apparent, the splice holder 10 is formed to accommodate both fusion splices and array ribbon splices. Each of the splice receiving channels 41 can alternatively engage and hold a fusion splice or an array ribbon splice.

As an additional feature of the invention, the obstruction walls 26 are arranged to be "shared" by two separate splice receiving channels 41. Consequently, the area of the splice holder 10 can be reduced. Further, adjoining sets of array ribbon splice arms can be staggered and positioned to overlap in a longitudinal direction. By example, referring to FIG. 4, longitudinally aligned array ribbon splice arms 38C and 38D are respectively staggered relative to longitudinally aligned array ribbon splice arms 38A and 38B such that arms 38A, 38B appear to at least partially overlap arms 38C, 38D as viewed in a direction parallel to the axes A, B. Through this arrangement, rearward deflection of all four arms 38A–38D is possible simultaneously. More significantly, the arrangement also allows for a reduction in area in the splice holder 10.

As yet another additional feature, reinforcing ribs 60 can be provided on the lower surface 17 of the base 14, to impart rigidity thereto. This is especially beneficial where the base 14 is discontinuous and edges of the base 14 can be subjected to deformation resulting from excessively high insertion forces in mounting splices to the splice holder 10.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A splice holder for accommodating various size fiber optic slices, said splice holder comprising:
   a base having an upper surface:
      a wall extending upwardly from said upper surface of said base;
      a deflectable first arm extending upwardly from said upper surface of said base to define a first height, said first arm being formed to engage and latch onto a fiber optic cable splice, said first arm being located at a first distance from said wall; and
      a deflectable second arm extending upwardly from said upper surface of said base to define height greater than said first height, said second arm being formed to engage and latch onto a fiber optic cable splice, said second arm being located at a second distance from said wall greater than said first distance, wherein said first and second arms unobstructedly face said wall.

2. A splice holder as in claim 1, wherein said wall defines a splice engaging surface, and both said first arm and said second arm are disposed to generally face said splice engaging surface.

3. A splice holder as in claim 1, wherein said first distance is nominally equal to a cross-sectional diameter of a fusion splice, and said second distance is nominally equal to a cross-sectional diameter of an array ribbon splice.

4. A splice holder as in claim 1, wherein said base is formed with opposing first and second ends, said first arm is located at a third distance from said first end of said base, and said second arm is located at a fourth distance from said first end of said base, said fourth distance being greater than said third distance.

5. A splice holder as in claim 1, wherein said wall has a protruding limiting wall section extending towards said first arm.

6. A splice holder as in claim 1, wherein said first arm and said second arm are similarly shaped, but differently dimensioned.

* * * * *